May 16, 1967 G. KLEIN 3,320,443
ELECTRIC CURRENT GENERATOR OF THE MAGNETOHYDRODYNAMIC TYPE
Filed May 7, 1962 5 Sheets-Sheet 1

INVENTOR
GEORGES KLEIN
BY Paul M. Craig, Jr.
ATTORNEY

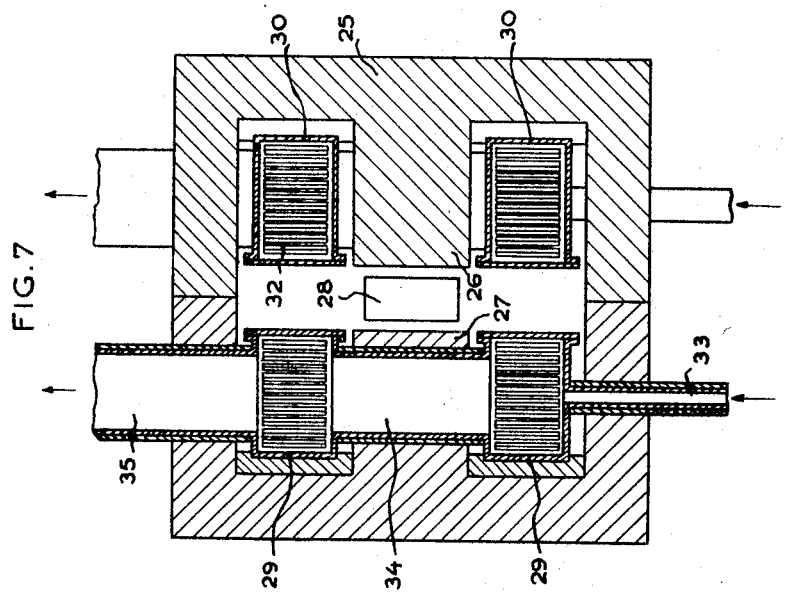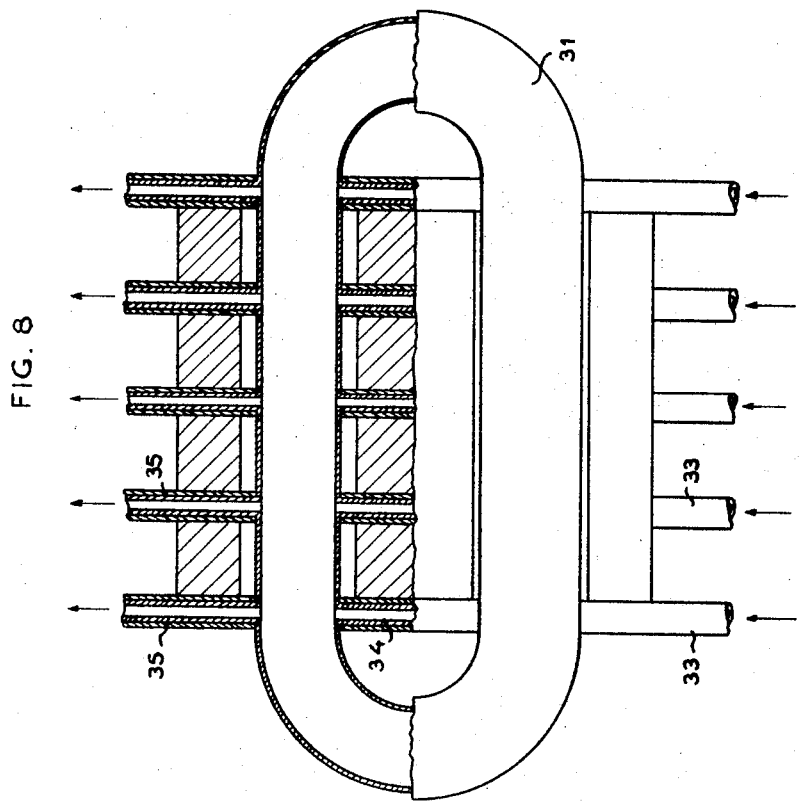

May 16, 1967 G. KLEIN 3,320,443
ELECTRIC CURRENT GENERATOR OF THE MAGNETOHYDRODYNAMIC TYPE
Filed May 7, 1962 5 Sheets-Sheet 5

INVENTOR
GEORGES KLEIN
BY Paul M. Craig, Jr.
ATTORNEY 3,320,443
ELECTRIC CURRENT GENERATOR OF THE
MAGNETOHYDRODYNAMIC TYPE
Georges Klein, Paris, France, assignor to Compagnie
Generale d'Electricite, Paris, France
Filed May 7, 1962, Ser. No. 192,682
Claims priority, application France, May 10, 1961,
861,430; Apr. 18, 1962, 894,919
7 Claims. (Cl. 310—11)

The present invention relates to electric current generators of the magnetohydrodynamic type.

It is known that such generators comprise a combustion chamber in which a gas is brought to high temperature, a nozzle at the outlet from the said chamber, through which the gas in question escapes and is projected into a duct between two parallel electrodes disposed in a magnetic field, and means for collecting the voltage set up between the said electrodes by the interaction of the hot ionized gas and of the magnetic field.

If $W_a$ is the electric power absorbed by the exciting winding of the circuit in which the magnetic field is set up, and $W_e$ is the electric power which it is possible to collect between the two electrodes, it will be obvious that the ratio $W_a/W_e$ must be as low as possible in order that the output of the generator may be acceptable. This ratio must be, for example, 5%.

It is also known that with homothetic generators the electric power $W_e$ collected varies in proportion with the volume of the duct of the generator and with the square of the magnetic induction in the said duct. If S is the cross section of the duct, L its length and B the induction, then $$W_e = \alpha B^2 S L$$

$\alpha$ being a constant coefficient.

On the other hand, the power $W_a$ absorbed by the exciting circuit is proportional to the perimeter $P_a$ of the induction winding, to the resistivity $\rho$ of the metal of which the said winding consists, and to the square of the induction B.

Thus: $W_a = \beta P_a \rho B^2$

Consequently:

$$\frac{W_a}{W_e} = \frac{\alpha}{\beta} \frac{P_a B^2}{SLB^2} = \frac{\alpha}{\beta} \frac{P_a \rho}{SL}$$

Now, $P_a/L$ is substantially constant for all generators, it being generally in the neighborhood of 2, so that the following can be written:

$$\frac{W_a}{W_e} = \gamma \frac{\rho}{S}$$

$\gamma$ being constant.

Moreover, the thermal power $W_{th}$ of the hot gas at the entry to the duct of the generator is proportional to the cross section S of the said duct, so that the following can finally be written:

$$\frac{W_a}{W_e} = k \frac{\rho}{W_{th}}$$

It will, therefore, be seen that, in order to reduce the ratio of $W_a/W_e$ without increasing the thermal power supplied to the hot gas, it is necessary to reduce the resistivity of the metal of which the exciter winding is constituted.

On the other hand, the "extracted electric output" is defined by the ratio $r_e = W_e/W_{th}$. Since $W_e$ is proportional to $B^2LS$ and $W_{th}$ is proportional to S, $r_e$ is proportional to $B^2L$.

It is obvious that this ratio must be as high as possible. Now, the length L cannot be increased, because the thermal losses and the pressure losses of the hot gas flux must be kept to moderate values. It is, therefore, desirable to increase the induction B. However, a limit is rapidly reached in this direction by the weight and the overall dimensions of the magnetic circuit, because when the induction exceeds about 2 teslas, the weight of iron-cored magnetic circuits becomes prohibitive, and it is necessary to use ironless circuits and the exciting power $W_a$, which must then be employed in order to obtain the same induction, is at least ten times as high as for an iron-cored magnetic circuit.

Now, as has been seen in the foregoing $$\frac{W_a}{W_e} = k \frac{\rho}{W_{th}}$$

or $$W_{th} = \rho \frac{W_e}{W_a}$$

it is necessary to considerably increase the thermal power $W_{th}$ of the generator in order to retain an acceptable ratio $W_e/W_a$ if $W_a$ increases and $\rho$ remains constant.

Thus, it has hitherto been possible to envisage the construction only of generators of very high power. In practice, generators having a thermal power lower than 400 megawatts could not be economically produced even accepting such a relatively high ratio $W_a/W_e$ is 10%. By way of example, with a conventional generator having a thermal power of 800 megawatts, it is possible to collect only a useful electric power $W_e$ of 200 megawatts, a power $W_a$ of 20 megawatts being absorbed in the exciting circuit.

The present invention makes it possible to overcome this limitation and either to increase the output of a generator of given thermal power or to provide generators of lower thermal power than has hitherto been possible with the same ratio $W_a/W_e$.

The magnetohydrodynamic generator according to the present invention by means of which these results can be obtained is characterized by the fact that the windings of its magnetic circuit are cooled by means of a cryogenic fluid in order to reduce the resistivity thereof.

It is already known to cool electric circuits by means of a liquefied gas for the purpose of reducing the resistance thereof. It has also been proposed to cool the windings of magnetic circuits in this manner, but not in magnetohydrodynamic generators in which they afford unexpected and surprising advantages.

The cryogenic fluid may be any liquefied gas, such as nitrogen, air, neon, hydrogen or helium, or a non-liquefied gas, such as hydrogen or helium.

The resistivity of the metal of which the winding consists may thus be reduced in a ratio of the order of 8, in the case of a copper conductor cooled by liquid nitrogen, or more, and may even be reduced to zero, if the metal is rendered super-conductive.

However, account must be taken of the power expended in the installation which produces the cryogenic fluid if the latter is liquefied in situ. Taking into account the said power, it is possible to obtain a reduction of the total power installed in a ratio ranging from 10 to 100 with non-super-conductive windings at about 30° K., and from 1000 to 100,000 with super-conductive windings at about 4° K.

If liquid nitrogen is employed as the cooling fluid, the present invention is particularly advantageous when this fluid is already supplied for other requirements in the installation of which the generator forms part.

This is the case, for example, if oxygen obtained in situ by liquefaction of air is employed in order to raise the temperature in the combustion chamber of the generator. The liquid nitrogen constituting the residue of this air liquefaction is then employed to cool the winding.

Under these conditions, the generator hereinbefore mentioned by way of example having a thermal power of 800 megawatts supplies a useful electric power of 197.5 megawatts instead of 180, which is a gain of about 10%. On the other hand, it is thus possible to produce under economically favorable conditions generators whose thermal power need not be higher than 100 megawatts.

If an aluminum or sodium winding cooled to 20° K. is employed, a generator having a thermal power of from 8 to 80 megawatts can be economically constructed.

Furthermore, if the winding employed consists of an alloy of niobium and tin which has been rendered superconductive, generators having a thermal power of only 80 to 800 kilowatts may be constructed.

Accordingly, it is an object of the present invention to provide an electric current generator of the magnetohydrodynamic type which obviates the shortcomings and inadequacies of the prior art constructions.

It is another object of the present invention to provide an electric current generator of the type described hereinabove which enables, for a given thermal power, to increase the output of the generator or to provide generators of lower thermal power than has hitherto been feasible with the prior art arrangements.

Still another object of the present invention resides in the provision of a magnetohydrodynamic electric current generator which may be used for the generation of relatively lower output powers.

Still a further object of the present invention resides in the provision of a magnetohydrodynamic current generator which is capable of operation at substantially higher efficiencies than attainable heretofore in the prior art arrangements.

These and other objects, features and advantages of the present invention will become more obvious from the following description when taken in connection with the accompanying drawings which shows, for purposes of illustration only, several embodiments of the present invention, and wherein FIGURE 1 is a schematic view of a generator, in a most general form, equipped with a cooling circuit according to the present invention.

FIGURE 7 is a horizontal cross-sectional view through an electromagnet in accordance with the present invention.

FIGURE 8 is an elevational view, partially in cross section, of the electromagnet of FIGURE 7.

Figure 1:
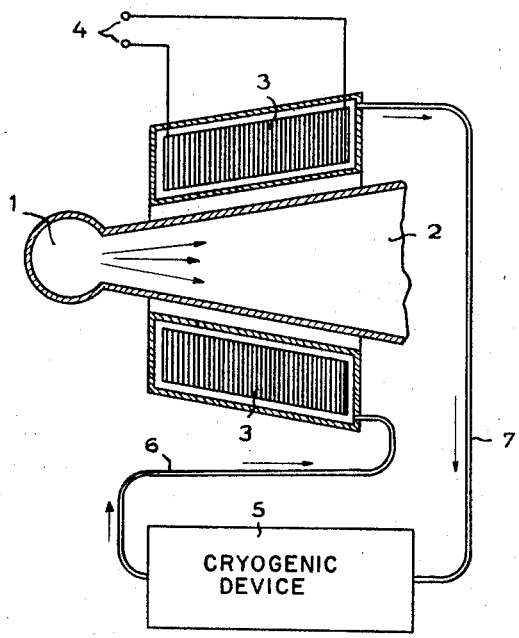

Referring now to the drawings, wherein like reference numerals are used throughout the various views to designate like parts, and more particularly, to FIGURE 1, reference numeral 1 designates therein the combustion chamber from which a hot gas is supplied to a duct 2 subjected to a magnetic field created by the flow through an electromagnet 3 of a current furnished by a suitable source connected to terminals 4.

The winding of the electromagnet 3 is subjected to the action of a cryogenic fluid. The structure of the electromagnet 3 and that of the cooling device thereof may be of any suitable known construction, for example, the cryogenic fluid may circulate through ducts or channels provided within the body of the winding of the electromagnet, but any other arrangement may also be utilized without departing from the spirit and scope of the present invention.

In FIGURE 1, there is shown, in the most general form, a cryogenic device 5 of any suitable construction which supplies a fluid to the electromagnet 3 through a duct or line 6, which fluid is returned through duct or line 7.

Figure 2:
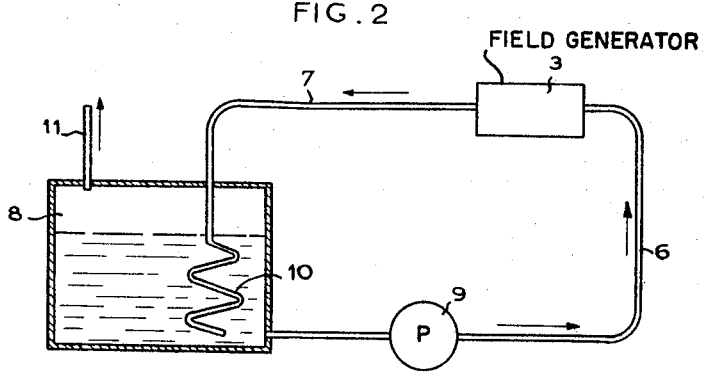
FIGURE 2 is a schematic view of one embodiment of a cooling installation utilizing a liquefied gas for use with an electric current generator in accordance with the present invention.

FIGURE 2 shows a possible form of utilization for the cryogenic device 5 applicable to the case in which the cryogenic fluid is a liquefied gas, such as air, oxygen, or nitrogen.

In this figure, reference numeral 8 designates a reservoir or tank containing the liquefied gas which is supplied by a pump 9 to the electromagnet 3 through line 6. The fluid, after having given up part of its cooling properties, at the outlet of electromagnet 3 is composed of a mixture of liquid and gas which returns to the tank 8 through a line 7 continued in an open coil 10. An open pipe or duct system 11 enables the evacuation of the gas.

Figure 3:
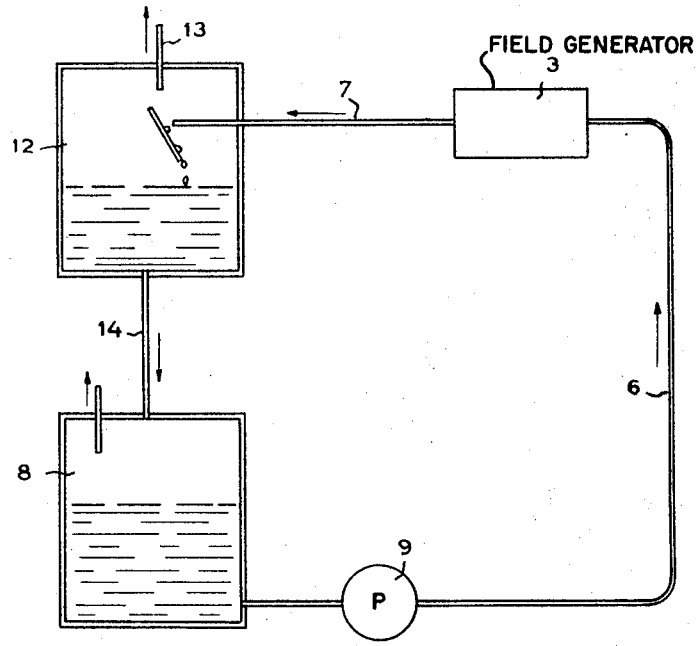
FIGURE 3 is a schematic view of a modified embodiment of a cooling installation in accordance with the present invention, similar to FIGURE 2, in which the separating means of the gas and of the liquid is independent of the tank for the liquefied gas.

FIGURE 3 is a modified embodiment of the device shown in FIGURE 2, in which the separating device of the gas and of the liquid is independent of the reservoir or tank for the liquefied gas. In this figure, as in the preceding figure, reference numeral 8 again designates the reservoir or tank for the liquefied gas, but the liquid-gas mixture at the outlet of the electromagnet 3 is transmitted to a separator 12. The gas escapes through duct or line system 13, whereas the liquid returns to the reservoir 8 through duct or line 14.

Figure 4:
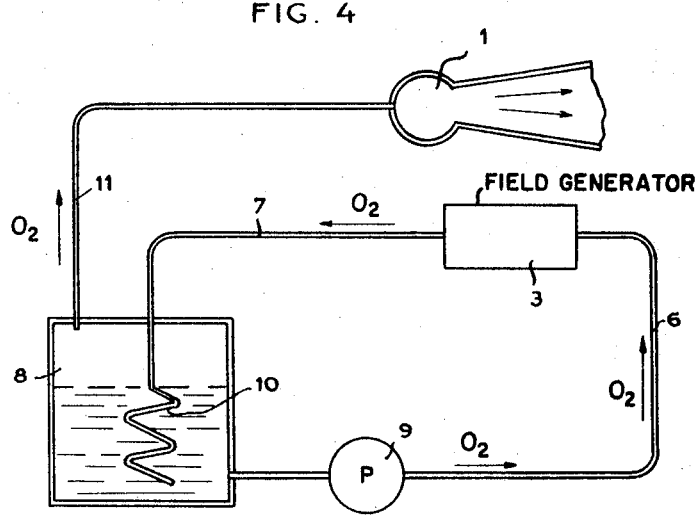
FIGURE 4 is a schematic view of still a further embodiment of an installation similar to FIGURE 2 in which the fluid is supplied to the combustion chamber.

FIGURE 4 illustrates an installation identical to that shown in FIGURE 2, except that the gas escaping through duct or line system 11 is supplied to the combustion chamber 1. This arrangement can, therefore, be utilized only in case the cryogenic fluid is oxygen.

Figure 5:
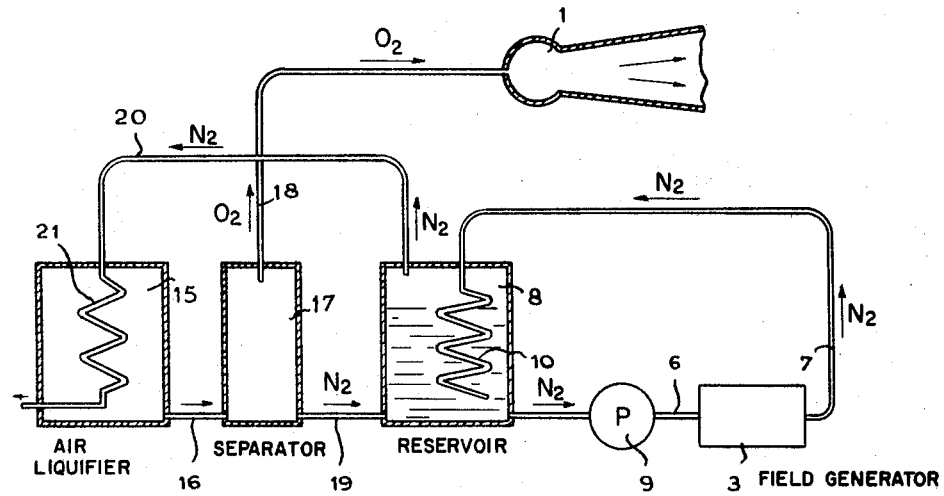
FIGURE 5 is a schematic view of still another modified embodiment in accordance with the present invention in which two types of cooling media are used.

FIGURE 5 illustrates an installation in which the cryogenic fluid is nitrogen obtained by liquefaction of air; the oxygen also resulting from this liquefaction is supplied to the combustion chamber.

This installation of FIGURE 5 comprises an air liquefier 15, supplying the liquid air to a separator 17 through a duct or line 16. At the outlet of this separator 17, the gaseous oxygen is transmitted to the combustion chamber 1 through a duct or line 18, while the liquid nitrogen is supplied to the reservoir-separator 8 through a duct or line 19 and subsequently to the electromagnet 3 by means of the pump 9, as in the preceding embodiments. The gaseous nitrogen escaping from the reservoir-separator 8 is returned through duct or line 20 to an exchanger 21 disposed in the liquefier 15, and evacuated through duct or line system 22.

Figure 6:
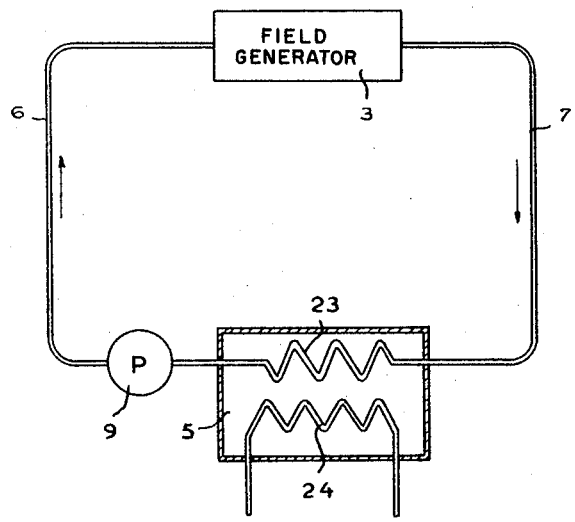
FIGURE 6 is a schematic view, similar to FIGURE 1, of an installation in accordance with the present invention in which the lining of the electromagnet is rendered superconductive through cooling by means of liquid helium or hydrogen.

FIGURE 6 represents schematically an installation as shown in FIGURE 1, whereby the same elements are again designated by the same reference numerals.

The cryogenic device 5 is, in this figure, a thermal exchanger comprising a first coil 23 connected in the pump-electromagnet circuit in which circulates a first cryogenic fluid, and a second coil 24 in which circulates a second cryogenic fluid supplied from a suitable source (not shown).

If the cryogenic fluids are helium or gaseous hydrogen, then the winding of the electromagnet may be cooled to near 30° absolute.

If these fluids are liquid helium or hydrogen, and if the metal constituting the winding of the electromagnet is suitable, this winding may assume the condition of superconductivity.

Figure 9:
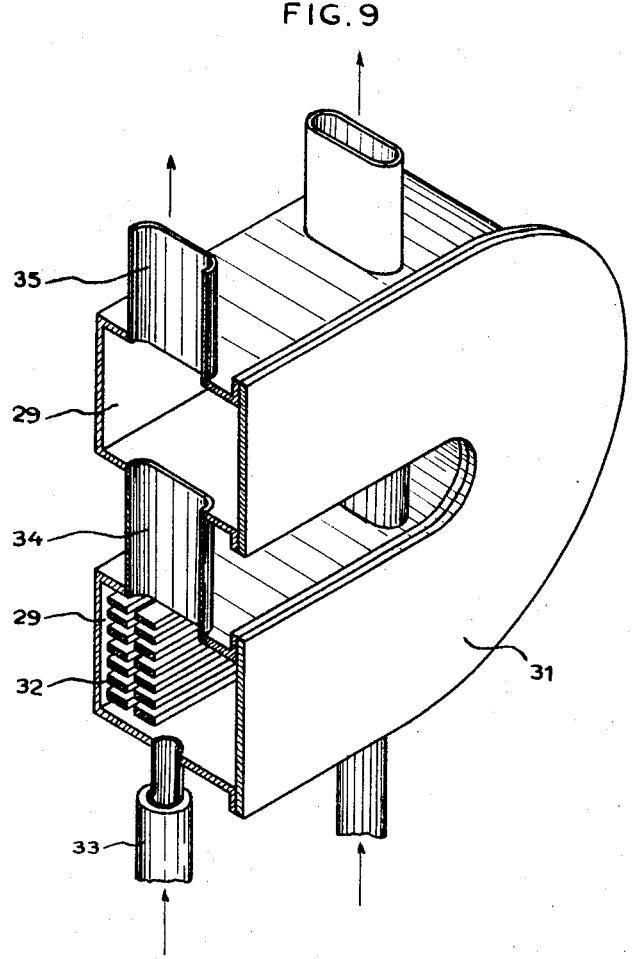
FIGURE 9 is a partial perspective view of the electromagnet illustrated in FIGURES 7 and 8.

FIGURES 7 to 9 illustrate one embodiment of the structure of the electromagnet and its cooling device.

FIGURE 7 is thereby a horizontal cross section through the electromagnet, while

FIGURE 8 is an elevational partially cross-sectional view and

FIGURE 9 is a perspective view thereof.

In FIGURES 7–9, reference numeral 25 designates the magnetic shell or housing, properly speaking; the magnetohydrodynamic chamber, schematically indicated at 28, is disposed between the polar pieces 26 and 27 thereof.

Two fluid-tight chambers 29 and 30 are disposed about poles 26, 27 on the inside of the shell or housing 25, which chambers have, in the illustrated embodiment, an oval shape and are each closed by a lid or cover, such as 31. The bars 32 of the inductor winding are located on the inside of these chambers 29 and 30.

A certain number of ducts or pipes, such as 33, through which is transmitted the cryogenic liquid terminate in one of the branches of these chambers 29 and 30. The two branches of one and the same chamber communicate with one another through ducts or channels, such as 34, in prolongation of ducts 33, but having a larger cross section. Finally, ducts or channels 35 take off in prolongation of ducts 34 from the second branch of the chamber, through which escapes a mixture of cryogenic liquid and its vapor which is freed by reason of the reheating the cooling medium has undergone in contact with the winding 32.

While I have shown several embodiments in accordance with the present invention, it is understood that the same is not limited thereto but is susceptible of many changes and modifications within the spirit and scope of the present invention and I, therefore, intend to cover all such changes and modifications as are encompassed by the appended claims.

I claim:

1. An electric current generator of the magnetohydrodynamic type having a space between electrodes in which a magnetic field exists, comprising means for passing a flux of hot ionized gas emanating from a combustion chamber through said space between the electrodes, means for producing a magnetic field within said space including a winding through which an electric current flows, and cooling means utilizing liquid oxygen for cooling said winding means including a cooling circuit having separator means for separating the gaseous oxygen from the liquid oxygen in the gas-liquid mixture returning from said winding, said seprator means being provided with means enabling the removal of the gaseous oxygen, and means for supplying said gaseous oxygen from said last-mentioned means to said combustion chamber.

2. An electric current generator of the magnetohydrodynamic type having a space between electrodes in which a magnetic field exists, comprising means for passing a flux of hot ionized gas emanating from a combustion chamber through said space between the electrodes, means for producing a magnetic field within said space including a winding through which an electric current flows, and cooling means utilizing a cryogenic fluid for cooling said winding including liquefier means for liquefying air, separator means, means for supplying the liquefied air from said liquefier means to said separator means to separate therein the liquid nitrogen from the liquid oxygen, separator-tank means, means operatively connecting said separator means with said separator tank means for supplying the separated liquid nitrogen from the former to the latter, means for supplying the liquid oxygen from said separator means to the combustion chamber, cooling circuit means for supplying liquid nitrogen from said separator tank means to said winding and for returning a mixture of liquid and gaseous nitrogen from said winding to said separator tank means, and means for supplying the separated gaseous nitrogen from said separator tank means to said liquefier means.

3. In an electric current generator of the magnetohydrodynamic type having a space between electrodes in which a magnetic field exists, comprising a combustion chamber providing a flux of hot ionized gas, means for passing said flux of hot ionized gas through said space between the electrodes, means for producing a magnetic field within said space including a winding through which an electric current flows and cooling means providing a cryogenic fluid for cooling said winding and further including means for applying a combustion supporting fluid to said combustion chamber, said cooling means further including means for producing said cryogenic fluid from a single gaseous mixture including heat exchange means for reducing said gaseous mixture to two intimately mixed fluids, said cooling means further including means for separating said two intimately mixed fluids, one of said fluids constituting said cryogenic fluid and the other of said fluids constituting said combustion supporting fluid, and means for supplying said intimately mixed fluids from said heat exchange means to said separating means, and further comprising means for circulating a gaseous portion of said cryogenic fluid returned from said winding through said heat exchange means.

4. An electric current generator as defined in claim 3 wherein said heat exchange means reduces air to the liquid phase, said intimately mixed fluids comprising liquid air.

5. In an electric current generator of the magnetohydrodynamic type having a space between electrodes in which a magnetic field exists, comprising a combustion chamber providing a flux of hot ionized gas, means for passing said flux of hot ionized gas through said space between the electrodes, means for producing a magnetic field within said space including a winding through which an electric current flows, and cooling means including a cryogenic fluid for cooling said winding and further including means for applying a combustion supporting fluid to said combustion chamber, including means for reducing air to the liquid phase and means for separating said air into first and second fluids, said first fluid constituting said cryogenic fluid consisting essentially of liquid nitrogen and said second fluid constituting said combustion supporting fluid consisting essentially of liquid oxygen, and a fluid tight ring traversed by input and output duct means encasing said winding for carrying said cryogenic fluid into close association with said winding.

6. An electric current generator as defined in claim 5 and further comprising separator-tank means, means operatively connecting said separating means with said separator-tank means for supplying the first separated fluid to the latter from the former, and cooling circuit means for supplying said first separated fluid from said separator-tank means to said input duct means and for connecting said output duct means back to said separator-tank means.

7. An electric current generator as defined in claim 6 wherein said means for applying a combustion supporting fluid to said combustion chamber includes means for supplying the second separated fluid in said separating means directly to said combustion chamber.

(References on following page)

References Cited by the Examiner

UNITED STATES PATENTS

| | | | |
|---|---|---|---|
| 2,958,183 | 11/1960 | Singelmann | 60—35.6 |
| 2,986,905 | 6/1961 | Kocher | 62—505 X |
| 3,091,709 | 5/1963 | Rosa | 310—11 |
| 3,239,697 | 3/1966 | Stekly | 310—11 |

FOREIGN PATENTS

| | | |
|---|---|---|
| 319,707 | 12/1930 | Great Britain. |
| 917,507 | 2/1963 | Great Britain. |

OTHER REFERENCES

Advances in Cryogenic Engineering, vol. 5, pp. 13, 14, 28, and 33 to 36 from papers by Post and Taylor extending from pages 13 to 37.

Cryogenic Engineering by Russell B. Scott; published by Van Nostrand Co., Princeton, N.J., pp. 13 and 79 to 83.

Discovery: The Magazine of Scientific Progress (London); August 1961, pp. 326 to 333.

MILTON O. HIRSHFIELD, *Primary Examiner.*

D. X. SLINEY, *Assistant Examiner.*